Patented Nov. 26, 1940

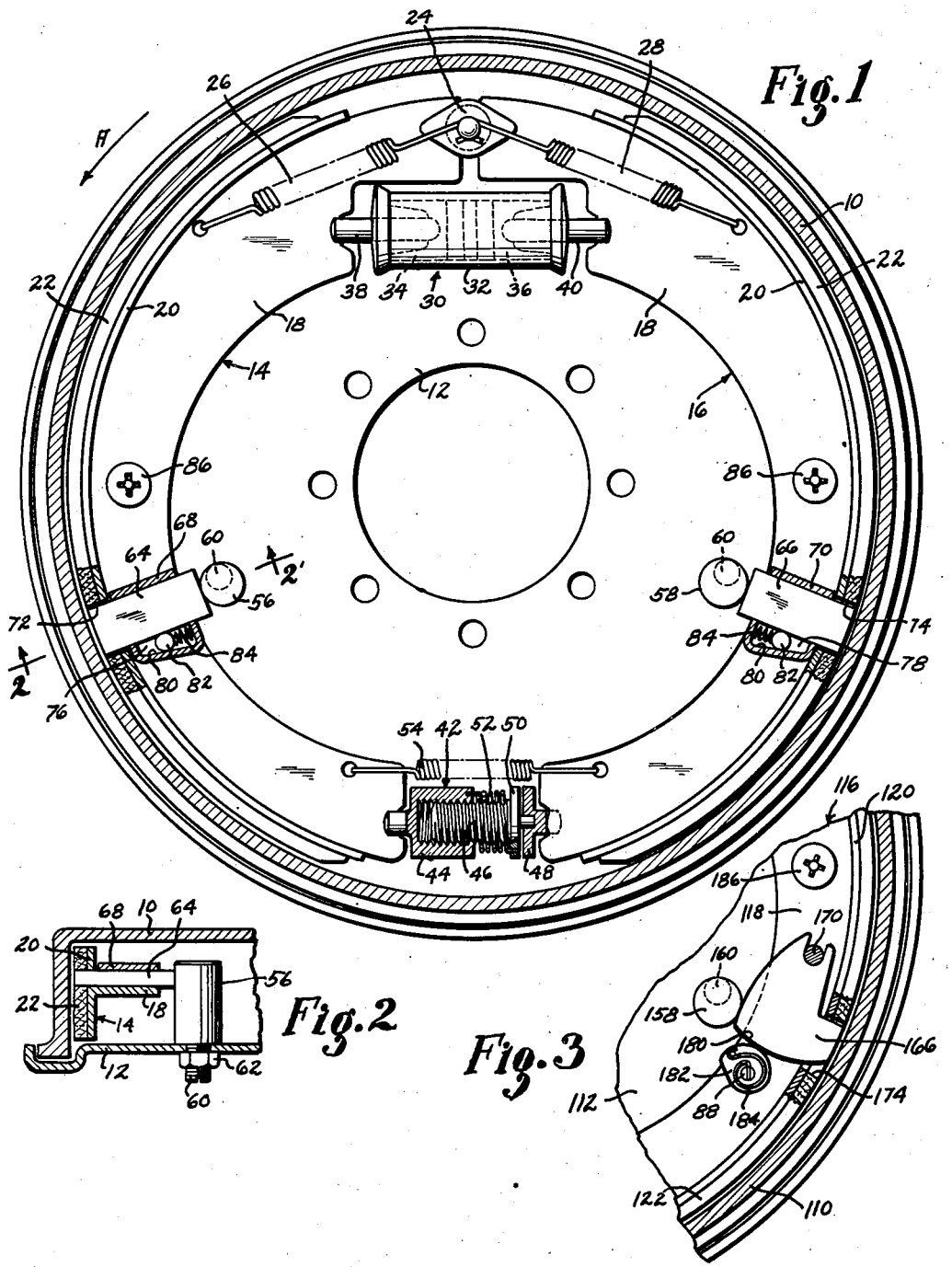

2,222,858

UNITED STATES PATENT OFFICE 2,222,858

BRAKE

William J. Ryan, Davenport, Iowa, assignor to Ralph J. Burton, Detroit, Mich.

Application January 26, 1938, Serial No. 186,920

4 Claims. (Cl. 188—79.5)

This invention relates to brakes of the two-shoe, shiftable-anchorage, servo type and more particularly to automatic adjusters therefor. In my prior application Serial No. 119,927 filed January 11, 1937, which has matured into Patent No. 2,189,226, Feb. 6, 1940, I have described and claimed several automatic adjusters applied to brakes of this and other types, and the present invention relates to improvements thereon.

Many attempts to provide automatic brake adjusters have been made, and the majority of these utilized the excessive movement of the braking elements resulting from wear to determine the need for adjustment and to cause it to take place. However, it was discovered that excessive movement of the braking elements also occurred from other causes than wear. For example, it is now well known that severe use of the brakes liberates a large amount of heat and thereby causes an appreciable expansion of the brake drum or corresponding element. The expansion of the drum naturally requires that the braking elements move farther in order to contact it. In adjusters utilizing the above principle, the expansion of the drum would cause adjustment to take place, and the subsequent cooling and contraction of the drum would then take up the normal clearance and lock the brake.

I have developed a new principle of brake adjustment wherein I measure the actual wear of the braking elements and compensate therefor, and several mechanisms employing this new principle have been shown in my above-identified application.

Consequently an object of my invention is to provide for two-shoe, shiftable anchorage, servo brakes an improved automatic adjuster utilizing the wear principle.

Another object is to provide a two-shoe shiftable-anchorage servo brake which is continuously, positively and accurately adjusted by automatic means in accordance with the actual wear of the brake shoe lining.

I prefer to accomplish these objects by providing that, in their released position, one adjacent pair of the shoe ends are held in engagement with the anchorage means by return springs, and by providing intermediate the ends of each of the shoes a return stop which is repositioned by engagement with the drum as the shoe wears, and by providing between the other adjacent pair of shoe ends, a floating articulating thrust element which is freely expansible to permit the shoes to separate as they are repositioned by said return stops, but which is not compressible so as to transmit thrust between the shoes when the brake is applied.

The above and other objects and desirable particular constructions will more fully appear upon reference to the following detailed description of two embodiments of my invention illustrated in the accompanying drawing, in which:

Figure 1 is a section just inside the head of the drum of a brake embodying my invention;

Figure 2 is a section on the line 2—2 of Figure 1; and

Figure 3 is a fragmentary view corresponding to a portion of Figure 1 of a modification.

In Figure 1 there is shown a brake comprising a rotatable drum 10, a fixed backing plate 12 closing the open end of the drum, and a pair of generally semi-circular shoes 14 and 16 within the drum. The shoes are formed with webs 18, rims 20 and friction linings 22 adapted to frictionally engage the inner surface of the drum 10.

Between one pair of adjacent shoe ends is an anchor pin 24 adapted to be engaged by complementary notches formed in the ends of the webs 18 of the shoes 14 and 16. Return springs 26 and 28 serve to return and hold the shoe ends against the anchor pin 24.

Radially inwardly of said anchor pin is a brake applying motor 30 comprising a hydraulic cylinder 32, pistons 34 and 36 and piston rods 38 and 40 respectively engaging the shoes 14 and 16 to spread them into engagement with the drum 10.

Between the other pair of adjacent shoe ends is a floating articulating thrust member 42 comprising a socket member 44 non-rotatably engaging the web of shoe 14, a screw member 46 having one end threaded into said socket and its other end rotatably received in a second socket member 48 non-rotatably engaging the web of the shoe 16. The screw member 46 has a flange 50 intermediate its length, and a helical torsion spring 52 is positioned between this flange and the end of the socket member 44 and torsionally engages said flange and socket member so as to tend to rotate the screw member 46 in a direction to screw it out of the socket and thereby elongate the entire thrust member 42. Tensioned between the said other pair of shoe ends is a spring 54 acting to hold the shoes and member 42, together, and exerting a pressure on the member 42 sufficient to prevent its elongation under the force of the spring 52.

Between the ends of each of the shoes 14 and 16 and adjacent the respective webs 18 are stop pins 56 and 58 secured to the backing plate by means of nuts 62 and eccentrically positioned threaded projections 60 formed with screw driver slots (see Fig. 2).

In contact with these stops, when the brake is released, are stop engaging plungers 64 and 66 of rectangular cross section slidably secured to the webs of the respective shoes 14 and 16 by means of housings 68 and 70 welded or otherwise secured to said webs. Each of these plungers projects through an opening 72 or 74 formed in the respective rims 20 and linings 22 of the shoes and terminates flush with the surface of the lining.

The housings 68 and 70 are provided with recesses 76 and 78 each of which has a surface 80 disposed at an angle to the edge of the plungers and, contacting these surfaces and the plungers, are rollers 82 urged into locking engagement with the plunger by means of springs 84. It will be noted that the surfaces 80 are inclined in a direction so that outward movement of the plungers is prevented by the rollers 82 while inward movement is freely permitted.

The usual steady rests 86 are provided on each shoe to hold it resiliently against the backing plate.

The arrow A (Fig. 1) shows the normal forward direction of rotation of the brake drum. In order to prevent "anchor click" when the brake is applied in the forward direction it is usual to make the spring 28 stronger than the spring 26 whereby shoe 14 will move into engagement with the drum while shoe 16 remains in contact with the anchor.

When the brake is initially assembled, plungers 64 and 66 are positioned flush with the linings 22 of the respective shoes 14 and 16, and the eccentric stop pins 56 and 58 are rotated until they contact the plungers 64 or 66 and move the shoes toward the drum to obtain a desired normal clearance between the shoes and the drum.

The spring 54 is lighter than the springs 26 or 28 so the shoes pivot about the anchor pin 24, and the ends opposite the anchor spread apart stretching spring 54 and permitting the torsion spring 52 to rotate the screw member 46. This expands the thrust member 42 until it occupies the full space between the shoe ends.

Thereafter the brake is operated in the usual manner. For example, with the drum rotating in the forward direction, hydraulic pressure applied to the motor 30 forces the shoe 14 against the drum. The braking force of the shoe 14 is applied through the thrust member 42 to the shoe 16, and the braking force of the shoe 16 is in turn applied to the anchor pin 24.

The same thing occurs in reverse braking except that when the shoe 14 engages the drum, the friction carries the shoes around in a clockwise direction (Fig. 1) until the shoe 14 engages the anchor pin 24 and the braking force of the shoe 16 is applied to the shoe 14 through the thrust element 42.

As the linings of the shoes 14 or 16 wear, the respective stop engaging plungers 64 or 66 contact the drum 10 when the brake is applied and are forced inwardly to a new position where they are held by the locking rollers 82. When the brake is released, the plungers 64 or 66 engage the respective stop pins 56 or 58 and hold the shoes in a new expanded position but with exactly the same clearance from the drum as previously set. This causes a further separation of the shoe ends between which the thrust member 42 is positioned and permits the torsion spring to expand said thrust member in accordance with the new shoe position.

From the above it will readily appear that no adjustment takes place until actual wear occurs, and that each shoe is maintained with the exact normal clearance originally set.

In the modification of Figure 3, in which corresponding parts have corresponding reference numerals plus one hundred, the stop engaging member is in the form of a lever 166 pivoted on the web 118 of the shoe 116 by means of a pin 170. A projection of the lever extends through the opening 174 in the rim 120 and lining 122 of the shoe and terminates flush with the lining. The lever is provided with an arcuate edge 180 centered on the center of the pivot 170, and this edge is engaged by a one-way locking cam 182 pivoted on the shoe 116 by means of a pin 88 and urged into locking engagement with said arcuate edge by means of a spiral spring 184. The one-way locking cam is formed to permit free inward swinging of the lever 166 and to prevent outward swinging thereof.

The operation of the brake employing this stop engaging member is identical with that just described, and it is therefore believed unnecessary to describe it further.

While two embodiments of my invention have been described in detail, it is not my intention to be limited to those embodiments or otherwise than by the terms of the accompanying claims.

I claim:
1. A brake comprising a rotatable drum, a fixed support, a pair of generally semicircular shoes mounted on said support and provided with a wearable friction lining adapted for frictional engagement with said drum, anchorage and applying means between one pair of adjacent shoe ends, spring means for moving said shoe ends into and maintaining said shoe ends in engagement with said anchorage means when the brakes are released, shoe positioning means intermediate the shoe ends on which the shoes are arranged to pivot so that when the brake is released the spring means in moving the shoe ends into engagement with the anchorage means causes the shoes to pivot on said positioning means to spread the other pair of adjacent shoe ends, said shoe positioning means comprising stop means secured to said support, members movably mounted on and slidable through an opening in the shoes so that one end is engageable with the drum when the brakes are applied and the other end engages with the stop means when the brakes are released, the first named end being formed with a portion flush with the surface of said friction lining, locking means for preventing movement of each said member in one direction while allowing movement in the other direction, means for adjusting said stop means relative to the support toward or away from the shoes, articulating thrust means comprising an internally threaded member associated with one shoe and an externally threaded member associated with the other shoe and threaded into the internally threaded member arranged between the other pair of adjacent shoe ends and constructed to expand in accordance with the spreading of the shoes by said spring means as the shoes pivot about said stop means, and a spring connecting the adjacent ends of the shoes between which said articulating thrust means acts and tensioned to draw these ends toward one another, said spring acting with less force than said spring means moving said shoes into engagement with said anchorage means so that the spring will yield and stretch to the preponderate force of said spring means when wear adjustment occurs.

2. A brake comprising a rotatable drum, a fixed support, a pair of generally semi-circular shoes mounted on said drum and provided with wearable friction lining adapted for frictional engagement with the drum, means between one end of said shoes for applying said shoes against the drum, an automatically expansible connecting link between the other ends of the shoes, and means controlled by the wear of the friction lining arranged to allow automatic expansion of said connecting link including a housing carried by each shoe, a member reciprocatingly mounted in each housing for movement toward and away from the drum and extending through the shoe for engagement with the drum, adjustable stop means against which each member abuts mounted on said fixed support for adjustment toward and away from the drum, each housing having a surface inclined to the path of movement of the member, and wedging means in each housing acting between the inclined surface and the member to hold the latter against movement outwardly toward the drum but permitting it to move in the opposite direction toward the stop means against which it abuts.

3. A brake comprising a rotatable drum, a fixed support, a shoe provided with a wearable friction lining adapted for frictional engagement with the drum and further provided with a reinforcing web on the side opposite to the friction lining, a member slidably disposed along one side of said web and projecting through a hole in the shoe and the friction lining for contact with the drum, a stop element carried by said fixed support against which said member abuts in brake released position, a housing fixed on the web forming in combination therewith a guide for slidably supporting said member in a path substantially perpendicular to the adjacent surface of the drum, one side of said housing extending at an angle to the path of movement of said member, a wedging element in the housing movable along the angular side of the housing and yieldingly pressed into engagement with the member in such a way that the member is held against movement on the shoe toward the drum but is permitted movement on the shoe away from the drum.

4. A brake comprising a rotatable drum, a fixed support, a shoe provided with a wearable friction lining adapted for frictional engagement with the drum and further provided with a reinforcing web on the side of the shoe opposite to the friction lining, a member pivotally supported on said web and projecting through a hole in the shoe and the friction lining for contact with the drum, a stop element carried by said fixed support against which said member abuts in brake released position, said member provided with an arcuate edge having its center on the pivotal point of the member, and a cam element rotatably supported on said web and bearing against the arcuate edge of the member, and spring means yieldingly acting to rotate said cam element into tighter engagement with said arcuate edge, said cam element so mounted with respect to the member that it will hold the latter against movement on the shoe toward the drum but permit movement thereof away from the drum.

WILLIAM J. RYAN.